No. 818,273. PATENTED APR. 17, 1906.
E. MOHR.
HANDLE FOR VESSELS OR RECEPTACLES.
APPLICATION FILED DEC. 28, 1904.

Witnesses.
J. H. Sirich Jr.
J. Ferdinand Vogt

Inventor.
Ernst Mohr
By Mann & Co,
Attorneys.

UNITED STATES PATENT OFFICE.

ERNST MOHR, OF MILWAUKEE, WISCONSIN, ASSIGNOR TO NATIONAL ENAMELING AND STAMPING COMPANY, A CORPORATION OF NEW JERSEY.

HANDLE FOR VESSELS OR RECEPTACLES.

No. 818,273.　　　　Specification of Letters Patent.　　　Patented April 17, 1906.

Application filed December 28, 1904. Serial No. 238,656.

*To all whom it may concern:*

Be it known that I, ERNST MOHR, a citizen of the United States, residing at Milwaukee, in the county of Milwaukee and State of Wisconsin, have invented certain new and useful Improvements in Handles for Vessels or Receptacles, of which the following is a specification.

This invention relates to improvements in handles for vessels and receptacles.

The object of the invention is to provide a reinforce for sheet-metal handles having a tubular hand-grasp part whereby to increase the strength of this cheap form of handle to such an extent as will enable it to be used on a better grade of vessel as well as on larger and heavier vessels which are subjected to rough handling, such as milk-cans or other shipping vessels.

The accompanying drawings illustrate the invention, in which—

Figure 1:
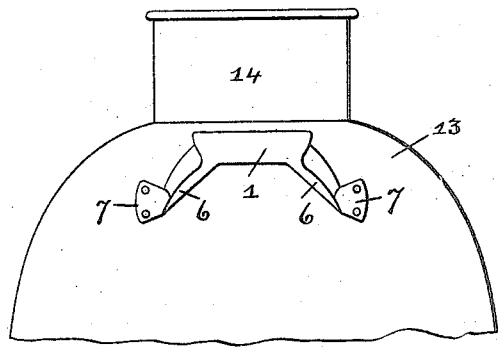
Figure 2:
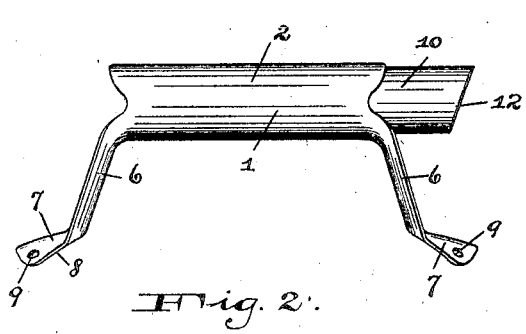
Figure 3:
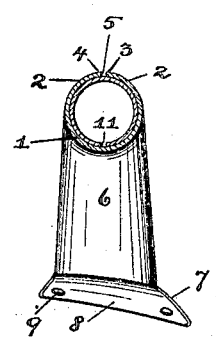
Figure 4:
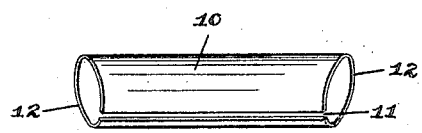

Figure 1 shows a side elevation of the upper portion of a milk-can provided with the improved reinforce tubular handle. Fig. 2 illustrates a side view of the unfinished handle and showing the inner reinforce-tube partially projecting, as it is before being completely entered. Fig. 3 is a cross-section through the reinforced tubular portion of the handle, and Fig. 4 is a separate view of the reinforce split tube.

The handle is formed from a blank stamped from sheet metal and comprises the central tubular portion 1, formed by curling the opposite side portions 2 with their edges 3 and 4 confronting each other, so as to form a split or slitted tube with the slit 5 extending longitudinally. Each end of the tube is open and has a leg 6, which extends downwardly in an inclined direction from the tube end, and these legs are concave in a crosswise direction to increase their strength and at their ends are provided with laterally-projecting feet 7, which are curved or concave on their bottom surface 8 to conform to the surface of the vessel to which the feet are to be secured. Perforations 9 are also provided in the feet through which rivets may be passed to secure the handle to a vessel.

The handle thus far described is formed from a single blank and while strong enough for light vessels it would not be durable enough for use on larger and heavier shipping vessels, and in order to reinforce and strengthen it sufficiently for this more severe service and to resist rough handling I have provided an inner reinforce which I will now describe.

The reinforce device comprises a tubular structure 10 of a diametrical size adapted to fit snugly within the tubular portion 1. This reinforce-tube is also provided with a longitudinal slit 11, extending from end to end, so as to enable it to yield in a circumferential direction while being inserted in the tubular handle 1 and to expand sufficiently after insertion to snugly fill said tube 1.

The manner of inserting the inner reinforce-tube within the tubular handle is immaterial and may be accomplished by contracting the inner tube, as described, or by leaving the outer tube slightly open to permit the insertion of the inner tube and then drawing or contracting said outer tube tightly around the inner tube. It is to be noted that when the reinforce inner tube is within the outer tube the slit 11 of the former has position at a point which is out of register with the slit 5—that is, it confronts the solid portion of the wall of the exterior tube and is preferably so located because that is the rigid point in the circumference of the outer tube. The ends 12 of the inner tube are beveled in the present instance to conform to the shape of the outer-tube ends and the ends of the two tubes are flush or coincident.

When the inner reinforce-tube has been inserted in the hand-grasp part of the handle, the entire structure is then submerged in a bath of molten tin, and the tinning solution will work or sweat through the slits 5 and 11 and the open ends and securely solder the reinforce-tube in place. The handle is then finished and in readiness to be securely riveted to the vessel, as shown in Fig. 1, in which it is shown attached to the breast 13 of a milk-can 14.

An advantageous feature of employing split or slitted tubes is that when the handle is being tinned the molten metal may work or sweat in through both slits between the tubes and at opposite sides, thus enabling the soldering of the tubes to be thoroughly accomplished.

Having thus fully described my invention, what I claim as new, and desire to secure by Letters Patent, is—

A metal handle having a split tubular body portion with legs formed integrally with and projecting downwardly from the lower side of the tubular portion whereby to leave the tubular portion open at the ends and the split in the body portion having position above the point where the legs and body unite and a split reinforce-tube extending through the tubular body portion with the split of the reinforce-tube confronting the solid portion of the tubular body.

In testimony whereof I affix my signature in presence of two witnesses.

ERNST MOHR.

Witnesses:
EDWARD H. SCHWARTZBURG,
JOHN WEGNER, Jr.